United States Patent
Bartram et al.

(10) Patent No.: US 7,392,375 B2
(45) Date of Patent: Jun. 24, 2008

(54) PEER-TO-PEER AUTHENTICATION FOR REAL-TIME COLLABORATION

(75) Inventors: Linda Ruth Bartram, Vancouver (CA); Mark Miller Chesser, Richmond (CA); Nicholas Sawadsky, Vancouver (CA); Steven Joseph Schumacher, Surrey (CA); Michael Blackstock, Coquitlam (CA)

(73) Assignee: Colligo Networks, Inc., Vancouver, BC (CA)

(*) Notice: Subject to any disclaimer, the term of this patent is extended or adjusted under 35 U.S.C. 154(b) by 679 days.

(21) Appl. No.: 10/245,303

(22) Filed: Sep. 18, 2002

(65) Prior Publication Data

US 2004/0054885 A1    Mar. 18, 2004

(51) Int. Cl.
    *H04L 9/00*    (2006.01)
(52) U.S. Cl. .......................... 713/152; 726/3
(58) Field of Classification Search ............ 726/3; 713/152
    See application file for complete search history.

(56) References Cited

U.S. PATENT DOCUMENTS

| | | | |
|---|---|---|---|
| 5,369,705 A | 11/1994 | Bird et al. | |
| 5,371,794 A | 12/1994 | Diffie et al. | |
| 5,510,777 A * | 4/1996 | Pilc et al. | 340/5.27 |
| 5,604,804 A | 2/1997 | Micali | |
| 5,898,780 A * | 4/1999 | Liu et al. | 713/155 |
| 6,058,188 A | 5/2000 | Chandersekaran et al. | |
| 6,061,796 A * | 5/2000 | Chen et al. | 726/15 |
| 6,151,620 A | 11/2000 | Madsen et al. | |
| 6,158,011 A * | 12/2000 | Chen et al. | 726/15 |
| 6,167,450 A | 12/2000 | Angwin et al. | |
| 6,167,521 A | 12/2000 | Smith et al. | |
| 6,202,157 B1 | 3/2001 | Brownlie et al. | |
| 6,385,724 B1 * | 5/2002 | Beckman et al. | 713/167 |
| 6,496,936 B1 * | 12/2002 | French et al. | 726/7 |
| 6,604,198 B1 * | 8/2003 | Beckman et al. | 713/167 |
| 6,668,322 B1 * | 12/2003 | Wood et al. | 713/182 |
| 6,691,172 B1 * | 2/2004 | Clow et al. | 709/246 |
| 6,853,988 B1 * | 2/2005 | Dickinson et al. | 705/75 |
| 6,857,073 B2 * | 2/2005 | French et al. | 713/168 |
| 6,865,599 B2 * | 3/2005 | Zhang | 709/218 |
| 6,898,642 B2 * | 5/2005 | Chafle et al. | 709/248 |

(Continued)

FOREIGN PATENT DOCUMENTS

EP    0 807 911    7/1999

(Continued)

OTHER PUBLICATIONS

Li Gong, JXTA: a network programming environment, Internet Computing, IEEE, vol. 5, Issue 3, May-Jun. 2001 pp. 88-95.*

(Continued)

*Primary Examiner*—Nasser Moazzami
*Assistant Examiner*—David Garcia Cervetti
(74) *Attorney, Agent, or Firm*—Thelen Reid Brown Raysman & Steiner LLP

(57) ABSTRACT

A peer-to-peer collaborative network system is described. The peer-to-peer collaborative network system uses an authentication system with multiple levels of authentication. This allows some collaboration applications to allow a collaboration with a high authentication level, but not to allow a collaboration with a lower level of authentication. Other collaborative applications can allow a collaboration with the lower level of authentication.

42 Claims, 8 Drawing Sheets

U.S. PATENT DOCUMENTS

| | | | |
|---|---|---|---|
| 6,915,426 B1* | 7/2005 | Carman et al. | 713/168 |
| 6,934,702 B2* | 8/2005 | Faybishenko et al. | 707/3 |
| 6,954,792 B2* | 10/2005 | Kang et al. | 709/229 |
| 6,956,614 B1* | 10/2005 | Quintana et al. | 348/373 |
| 6,957,199 B1* | 10/2005 | Fisher | 705/78 |
| 6,961,723 B2* | 11/2005 | Faybishenko et al. | 707/3 |
| 6,962,277 B2* | 11/2005 | Quintana et al. | 224/262 |
| 7,024,429 B2* | 4/2006 | Ngo et al. | 707/201 |
| 7,069,438 B2* | 6/2006 | Balabine et al. | 713/168 |
| 7,082,200 B2* | 7/2006 | Aboba et al. | 380/273 |
| 7,085,840 B2* | 8/2006 | de Jong et al. | 709/229 |
| 7,099,871 B2* | 8/2006 | Faybishenko et al. | 707/10 |
| 7,106,861 B1* | 9/2006 | Nishimura et al. | 380/200 |
| 7,120,691 B2* | 10/2006 | Goodman et al. | 709/225 |
| 7,127,613 B2* | 10/2006 | Pabla et al. | 713/171 |
| 7,130,999 B2* | 10/2006 | Yasala et al. | 713/157 |
| 7,136,927 B2* | 11/2006 | Traversat et al. | 709/230 |
| 7,143,441 B2* | 11/2006 | Rygaard | 726/22 |
| 7,187,771 B1* | 3/2007 | Dickinson et al. | 380/228 |
| 7,234,156 B2* | 6/2007 | French et al. | 726/2 |
| 2001/0013055 A1* | 8/2001 | Kojima et al. | 709/205 |
| 2002/0029278 A1* | 3/2002 | Shiouchi et al. | 709/229 |
| 2002/0074370 A1* | 6/2002 | Quintana et al. | 224/262 |
| 2002/0107792 A1* | 8/2002 | Anderson | 705/40 |
| 2002/0147771 A1* | 10/2002 | Traversat et al. | 709/203 |
| 2002/0147810 A1* | 10/2002 | Traversat et al. | 709/224 |
| 2002/0152271 A1* | 10/2002 | Chafle et al. | 709/204 |
| 2002/0169983 A1* | 11/2002 | Rygaard | 713/201 |
| 2002/0184070 A1* | 12/2002 | Chen et al. | 705/9 |
| 2002/0184311 A1* | 12/2002 | Traversat et al. | 709/204 |
| 2002/0184357 A1* | 12/2002 | Traversat et al. | 709/223 |
| 2002/0188657 A1* | 12/2002 | Traversat et al. | 709/201 |
| 2003/0014513 A1* | 1/2003 | Ruths et al. | 709/223 |
| 2003/0018719 A1* | 1/2003 | Ruths et al. | 709/205 |
| 2003/0028585 A1* | 2/2003 | Yeager et al. | 709/201 |
| 2003/0033517 A1* | 2/2003 | Rutherglen et al. | 713/153 |
| 2003/0044020 A1* | 3/2003 | Aboba et al. | 380/278 |
| 2003/0046586 A1* | 3/2003 | Bheemarasetti et al. | 713/201 |
| 2003/0046587 A1* | 3/2003 | Bheemarasetti et al. | 713/201 |
| 2003/0055894 A1* | 3/2003 | Yeager et al. | 709/204 |
| 2003/0055898 A1* | 3/2003 | Yeager et al. | 709/205 |
| 2003/0084170 A1* | 5/2003 | de Jong et al. | 709/229 |
| 2003/0088544 A1* | 5/2003 | Kan et al. | 707/3 |
| 2003/0093663 A1* | 5/2003 | Walker | 713/150 |
| 2003/0101235 A1* | 5/2003 | Zhang | 709/218 |
| 2003/0105812 A1* | 6/2003 | Flowers et al. | 709/203 |
| 2003/0163697 A1* | 8/2003 | Pabla et al. | 713/171 |
| 2003/0177186 A1* | 9/2003 | Goodman et al. | 709/205 |
| 2003/0187918 A1* | 10/2003 | Burbeck et al. | 709/203 |
| 2003/0187974 A1* | 10/2003 | Burbeck et al. | 709/224 |
| 2003/0208540 A1* | 11/2003 | Kawahara et al. | 709/205 |
| 2003/0217139 A1* | 11/2003 | Burbeck et al. | 709/224 |
| 2003/0217266 A1* | 11/2003 | Epp et al. | 713/163 |
| 2004/0019890 A1* | 1/2004 | Verbeke et al. | 718/100 |
| 2004/0034540 A1* | 2/2004 | Chen et al. | 705/1 |
| 2004/0044727 A1* | 3/2004 | Abdelaziz et al. | 709/203 |
| 2004/0083394 A1* | 4/2004 | Brebner et al. | 713/202 |
| 2004/0098458 A1* | 5/2004 | Husain et al. | 709/204 |
| 2004/0107420 A1* | 6/2004 | Husain et al. | 718/100 |
| 2004/0172399 A1* | 9/2004 | Saffre | 707/100 |
| 2004/0198220 A1* | 10/2004 | Whelan et al. | 455/41.1 |
| 2005/0060432 A1* | 3/2005 | Husain et al. | 709/246 |

FOREIGN PATENT DOCUMENTS

| | | |
|---|---|---|
| EP | 1 024 626 | 8/2000 |
| EP | 1 119 132 | 7/2001 |
| EP | 1 120 934 | 8/2001 |
| EP | 1 134 670 | 9/2001 |
| EP | 1 137 220 | 9/2001 |
| EP | 1 148 675 | 10/2001 |
| EP | 1 176 755 | 1/2002 |
| WO | 00/04673 | 1/2000 |
| WO | 00/56007 | 9/2000 |
| WO | 01/08351 | 2/2001 |
| WO | 01/13201 | 2/2001 |

OTHER PUBLICATIONS

Kim et al., A Secure Platform for Peer-to-Peer Computing in the Internet, Jan. 2002, IEEE.*

Sun Microsystems, Project JXTA: An Open, Innovative Collaborations Apr. 2001, <http://www.jxta.org>.*

Kortuem et al., When peer-to-peer comes face-to-face: collaborative peer-to-peer computing in mobile ad-hoc networks, Aug. 2001, IEEE.*

Yeager et al., Secure peer-to-peer networking: the JXTA example, IEEE, IT Professional, vol. 4, Issue 2, Mar.-Apr. 2002 pp. 53-57.*

Li Gong, JXTA: a network programming environment, Internet Computing, IEEE, vol. 5, Issue 3, May-Jun. 2001 pp. 88-95.*

* cited by examiner

PEER-TO-PEER AUTHENTICATION FOR REAL-TIME COLLABORATION

BACKGROUND OF THE INVENTION

The present invention generally relates to user authentication for purposes of secure information exchange and more particularly to a system and method of user authentication over a peer-to-peer network.

With the popularity of portable computing devices (i.e., personal digital assistants (PDA's, cell phones, etc.) increasing, there comes a greater need and ability to share information between devices in mobile and ad-hoc environments where fixed network infrastructure varies or does not exist. Peer-to-peer networks can be established between the devices so that collaborative information can be shared. Ensuring that such networks are secure poses a challenge. A key aspect of that security is ensuring the identity of a peer user in the network (i.e., authentication).

Currently, in the prior art, there exist well-established methods for establishing secure connections between client and server computers where security infrastructure exists. These methods assume that the information required for authentication is present prior to establishing a connection. The methods may use public key cryptography and rely on a certificate authority (CA) for certificate validation. The interaction between a web browser and a secure web server is an example of such a method. The server must present a certificate that has been digitally signed by one of the browser's trusted certificate authorities. Root certificates of major certificate authorities must be pre-installed on the user's computer along with the web browser, allowing the browser to verify the digital signature on the server's certificate. However, these methods may not be appropriate for peer-to-peer networks, in which new peers may be encountered at any time, and there is no central authority to issue certificates.

Pretty Good Privacy (PGP) is a peer-to-peer system of authentication and secure information exchange. Peers obtain copies of each other's certificates and assign a level of trust to the certificate. A peer may be trusted if a copy of its certificate is already present in the local trusted database, or if a trusted peer has digitally signed its certificate.

PGP enables the user to establish a web of trust that can be extended across several degrees of direction. However, this can weaken authentications as the chain between peers extends. Secure authentications can be made indiscriminately as this chain of trust extends between peers.

While PGP eliminates the need for certificate authorities, it still does not address the security needs of real-time peer-to-peer collaboration. PGP is used for non-real-time applications, such as the encryption of files and email. It does not permit a secure connection to be established for ongoing information exchange in real-time. Furthermore, PGP relies upon publicly accessible certificate directories hosted on centralized servers for the distribution of certificates. Additionally, PGP does not separate encryption and the establishment of encrypted connections from authentication.

In a self-organizing system, peers can maintain all authentication information locally. However, the computing and memory constraints of some portable devices limit the capacity of the device to store and retrieve a large number of certificates, which occurs as users enter and leave the network. An additional difficulty arises in how the authentication requirements are imposed on the participants in the network. Particularly, in ad-hoc network configurations common to portable peer-to-peer networks, users may demand more stringent authentication for particular types of applications or activities without relinquishing the potential to exchange information with peers that have not been authenticated as stringently for less secure activities.

BRIEF SUMMARY OF THE INVENTION

One embodiment of the present invention concerns peer-to-peer network software for a unit connectable to a peer-to-peer network. The peer-to peer network software includes collaborative application software adapted to allow collaboration between units on the peer-to-peer network. The peer-to-peer network software also includes authentication software adapted to produce an authentication level indication concerning the identity of another unit in the peer-to-peer network. The possible authentication levels include a high authentication level and a low authentication level. The low authentication level is some evidence of unit authentication. The collaborative application software uses the authentication level indication to decide whether to allow a collaboration with another unit. At least one collaborative application allows a collaboration with another unit when the authentication level indication is high but does not allow a collaboration with the another unit when the authentication level indication is low.

Another embodiment of the present invention is a method. The method includes producing an authentication level indication concerning the identity of another unit in a peer-to-peer network. The possible authentication levels include a high authentication level and a low authentication level. The low authentication level is some evidence of unit authentication. The method also includes using the authentication level indication to decide whether to allow a collaboration session with another unit. At least one collaborative application allows a collaboration session when the authentication level indication is high but does not allow a collaboration session when the authentication level indication is low.

In one embodiment each peer obtains a copy of the other's certificate. Each peer has its own self-signed certificate and private key. When establishing a connection, the peers exchange their certificates in the clear. The certificates obtained in this fashion are then used to establish an encrypted connection with a dynamic session key. The Secure Socket Layer (SSL) can be used to negotiate the session key and for subsequent data encryption, but other schemes are possible. In one embodiment, the authenticity of the certificate presented over the connection may be verified using one of four authentication methods:

(1) A peer may simply accept the other's identity and trust the peer is who he says he is (often the case when the peers are physically co-located).

(2) A peer may compare the certificate's digital fingerprint with one obtained from the other peer through direct verbal communication, over the telephone, or by some other means external to the peer-to-peer network.

(3) The peer may obtain the other peer's full certificate by some means external to the peer-to-peer network (e.g. floppy disk, secure e-mail) and compare it to the one obtained across the connection.

(4) The peer may confirm the other peer's identity using a certificate authority (CA) if one is present.

Each of these authentication processes is assigned an authentication level (confidence level) related to its security. From least to most secure, these are: simple acceptance, fingerprint comparison, out-of-band certificate comparison and certificate authority confirmation.

In one embodiment, the method includes a means for automating part of the authentication process if the peer's certificate has been previously authenticated by a third party whom the user trusts to authenticate others. In this case the certificates are exchanged and authentication takes place implicitly where the user does not have to explicitly execute the steps related to authentication. The method additionally includes a way of recording the confidence level and the type of authentication with the certificate.

In accordance with the present invention, there is also provided a system for establishing a connection between users on a peer-to-peer network. The system includes a plurality of computers in a peer-to-peer network wherein each computer has its own certificate and specialized software. The software is configured to establish a secure connection according to the above method and then use that connection to securely exchange information in real-time. The software can use SSL to perform the security exchange and subsequent encryption.

BRIEF DESCRIPTION OF THE DRAWINGS

These as well as other features of the present invention will become more apparent upon reference to the drawings.

DETAILED DESCRIPTION

An exemplary embodiment of the present invention concerns peer-to-peer network software for a unit connectable to a peer-to-peer network. The peer-to peer network software, such as peer-to-peer software 102 of FIG. 1, includes collaborative application software, such as collaborative application software 104 of FIG. 1, adapted to allow collaboration between units on the peer-to-peer network.

Figure 1:
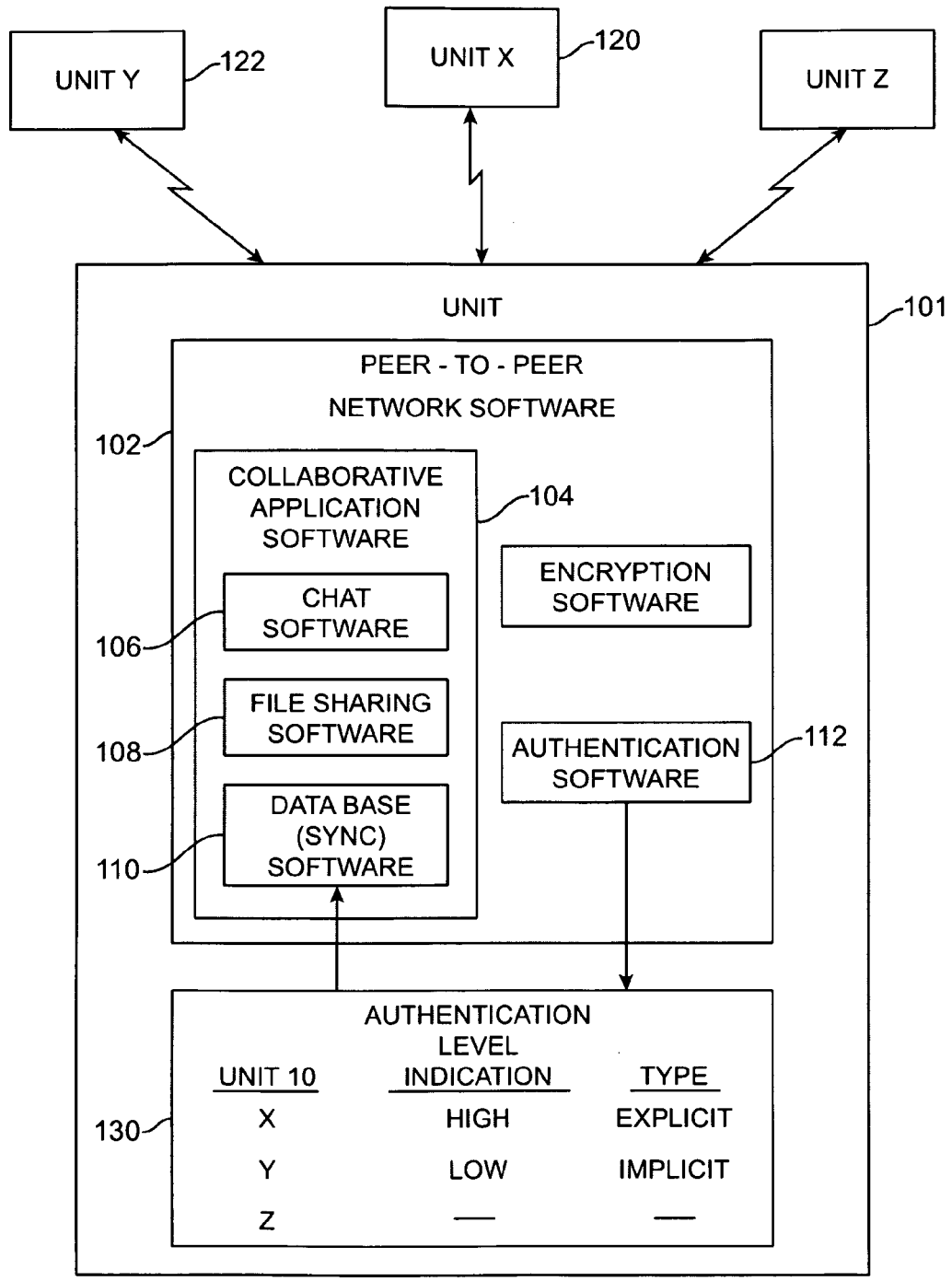
FIG. 1 is a functional diagram of a system of one embodiment of the present invention.

The peer-to-peer network software also includes authentication software, such as authentication software 112 of FIG. 1, adapted to produce an authentication level indication concerning the identity of another unit in the peer-to-peer network. The possible authentication levels include a high authentication level and a low authentication level. The low authentication level is some evidence of unit authentication.

In the example of FIG. 1, the database synchronization software 110 may require an authentication level indication of high before allowing these collaborations: for example, permit a synchronization between unit 101 and unit 120 but not allow a synchronization between unit 101 and unit 122.

Examples of collaborative application software include chat software 106, file sharing software 108, and database synchronization software 110. There can be more than two authentication levels, and as described below, the authentication levels can be associated with different levels of authentication. In one example, there is an authentication level indication of nil which indicates no evidence of individual authentication. This nil level is lower than the low authentication level. In one embodiment, the collaboration application includes resource sharing, such as file, printer, or Internet connection sharing.

In an exemplary embodiment, at least one collaborative application allows for the collaboration when the authentication level indication is low. In the example of FIG. 1, the chat software 106 may allow for chat interactions with unit 122 even though the authentication level indication responded to unit 122 is low.

In an exemplary embodiment, there can be more than two authentication levels. In the exemplary embodiment, as described below, there are four authentication levels corresponding to from least secured to most secured, simple acceptance, fingerprint comparison, out-of-band certificate comparison and certificate authority confirmation.

In an exemplary embodiment, the authentication level indication is stored along with an identifier for the unit. For the example of FIG. 1, the memory 130 stores the authentication level indications along with the unit identification. In an exemplary embodiment, the authentication allows for implicit authorization of the unit. Implicit authorization is when a second unit authenticates a third unit for a first unit with the first unit without the first unit having to explicitly authenticate the third unit.

The collaborative application software uses the authentication level indication to decide whether to allow a collaboration with another unit. At least one collaborative application allows a collaboration with another unit when the authentication level indication is high but does not allow a collaboration with another unit when the authentication level indication is low.

Figure 2:
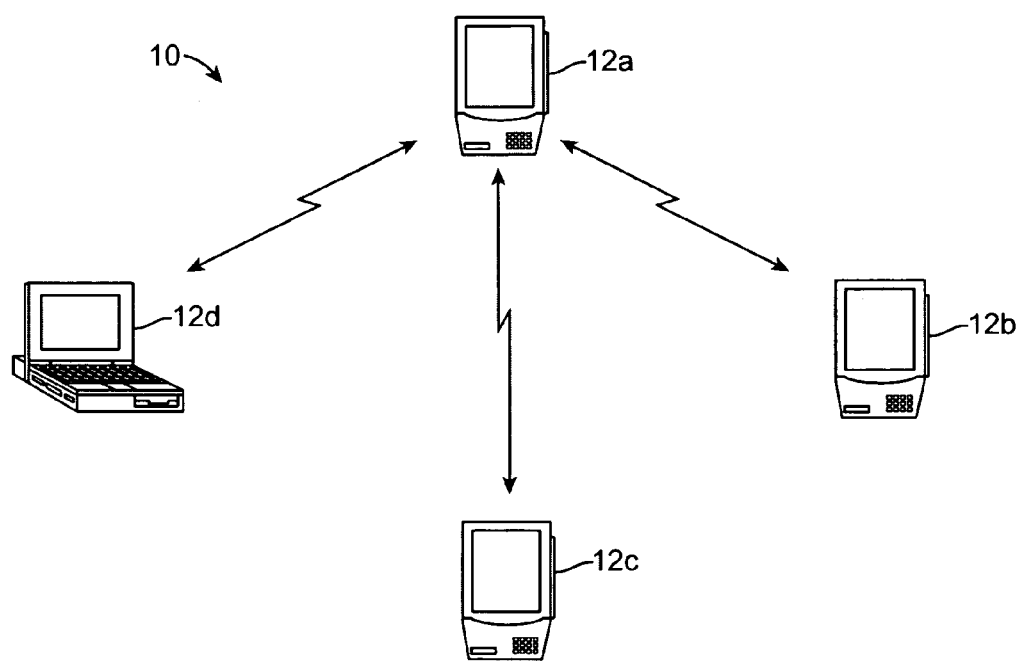
FIG. 2 illustrates an exemplary peer-to-peer network of one embodiment of the present invention.

The following description describes an example embodiment of the present invention. FIG. 2 is a diagram illustrating how electronic devices are arranged in a peer-to-peer network 10 with a need for a secure connection. Specifically, the peer-to-peer network 10 has multiple electronic devices in communication with one another. The peer-to-peer network 10 may be a wired network or a wireless network as shown. For the wireless network 10 shown in FIG. 1, electronic devices such as Personal Digital Assistants (PDA's) 12a-12c and laptop computer 12d each contain some type of wireless devices such as wireless modem or wireless network access device. The present invention can be used with any type of physical network such as Bluetooth, local area network (LAN), Ethernet, etc. The electronic devices 12 shown in FIG. 2 are configured in a peer-to-peer network. Each of the devices is a portable electronic device that contains some type of processor, memory and display.

Figure 3:
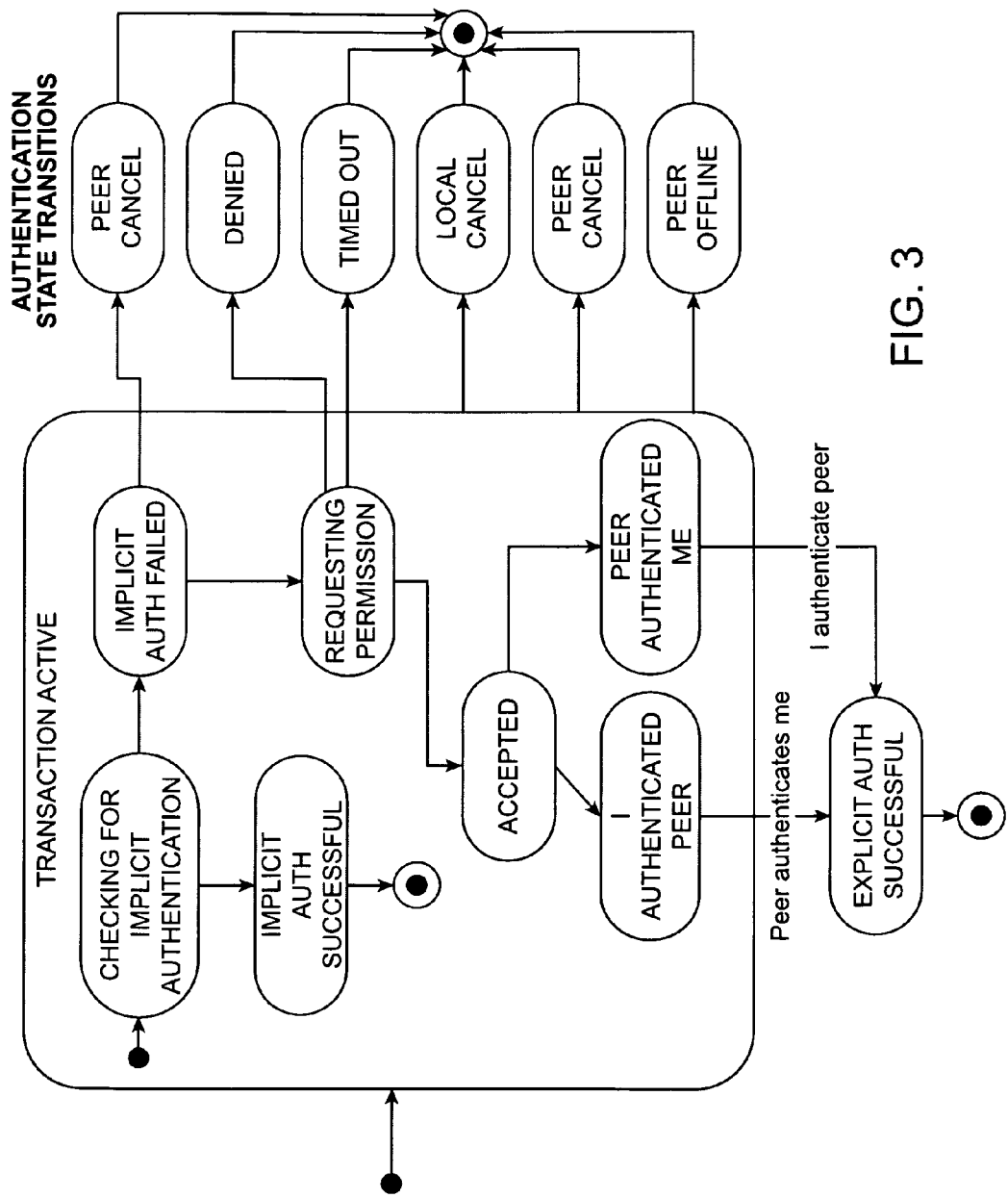
FIG. 3 is a diagram that illustrates the authentication process of one embodiment of the present invention.

As previously mentioned above, it is desirable to establish a secure connection between the electronic devices 12. For instance, device 12a would want to establish secure connections with devices 12b, 12c, and 12d. Referring to FIG. 3, the devices 12 in the peer-to-peer network can establish secure connections by first obtaining certificates that allow the devices 12 to establish the secure connection. In order to establish the secure connection electronic devices (i.e., peers) exchange certificates for authentication of each party in the secure connection. Each peer has its own self-signed certificate and private key. When establishing a connection, the peers exchange their certificates in the clear. The certificates obtained in this fashion are then used to establish an encrypted connection with a dynamic session key. In one implementation, the Secure Sockets Layer (SSL) is used to negotiate the session key and for subsequent data encryption, but other schemes are possible.

In one embodiment, the device authenticates the peer's certificate by one of four authentication methods: simple acceptance, usually because the device and peer users can visually or verbally confirm identity; digital certificate fingerprint comparison; full certificate comparison using copies of the certificates obtained through some out-of-band method (such as floppy disk exchange, secure e-mail, etc); or external validation using a certificate authority (CA) if one is available. For instance, the device could receive the digital fingerprint of the peer by some method external to the network such as via verbally from the user of the peer. The user of the device would then compare the digital fingerprint received out-of-band with the one generated from the originally received certificate. One method of comparison would involve entering in the out-of-band digital fingerprint into the device for automatic comparison, but other methods are also possible. Once the fingerprint from the peer has been compared and matched with the fingerprint in the device, then the certificate is authenticated.

In one embodiment, once the secure connection is established, authentication must occur in order to proceed. Specifically, if a device has not previously authenticated the other peer (i.e., there is no entry in the trusted database) and the current activity requires the device to do so, then the device must authenticate the other through a separate authentication process.

In one embodiment, a user can specify authentication levels required of other peers. For example, the user can set the requirements for a given collaboration application. A preferences file or other means can be used to implement this function. In one embodiment, the peer's authentication levels can be inspected by the user prior to setting the requirements.

In one embodiment, the authentication level indication can be subsequently upgraded by re-authentication of the peer using a more secure authentication approach.

Figure 4:
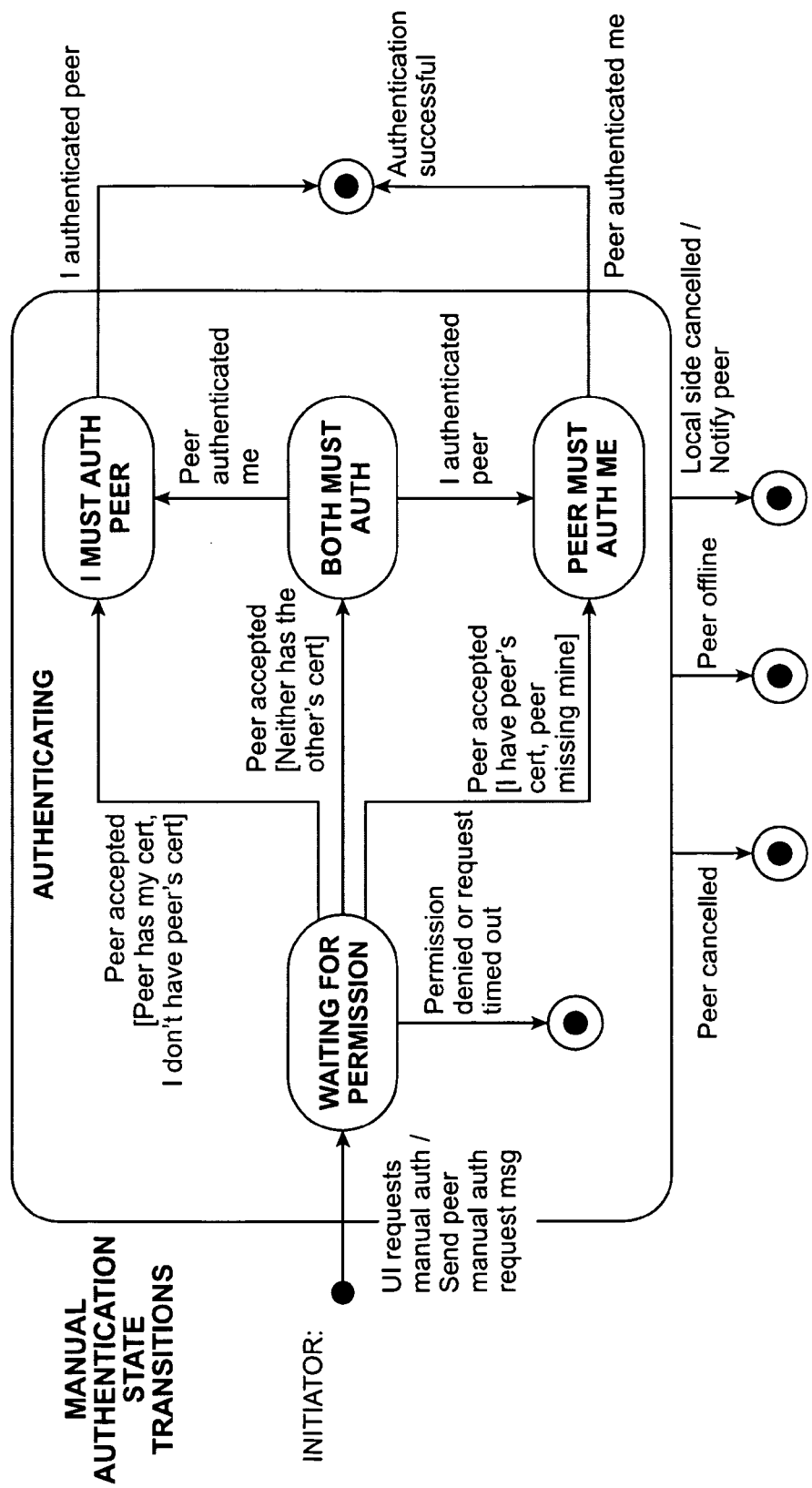
FIG. 4 is a diagram that illustrates explicit authentication of one embodiment of the present invention.
Figure 4:
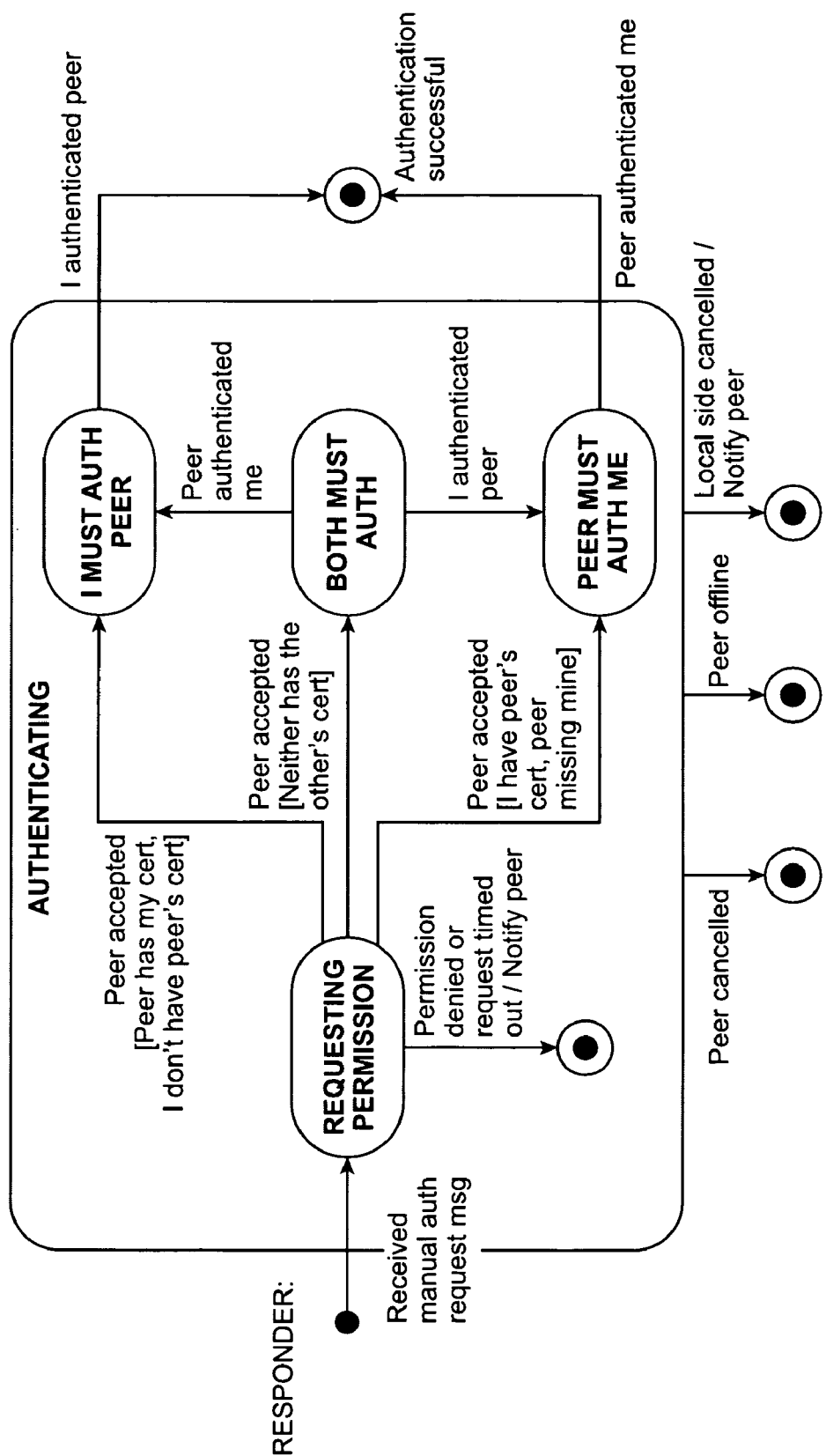

Authentication can occur either explicitly or implicitly. Referring to FIG. 4, in explicit authentication, the device requests permission of the peer to begin authenticating. If the peer accepts, then each party has the option to:
  (1) believe that the peer on the other side is who they claim to be (i.e., lowest level of authentication);
  (2) compare the digital fingerprint of the certificate obtained on the wire to one obtained from the peer out-of-band (e.g., over the phone, visually—this is a medium level of authentication);
  (3) compare the certificate obtained on the wire to a copy obtained by a trusted out-of-band means (e.g., floppy disk, hardware device, infrared (IR)) which results in a high level of authentication; or
  (4) compare the certificate to one obtained from a standard certificate authority if available. This is the highest level of authentication.

Each authentication level can be referred to as an authentication level (confidence level).

In one embodiment, once the explicit authentication is complete, then each peer signs the other's certificate, indicating they have verified the identity of the device (henceforth user) associated with the certificate. Each peer can then import the other's certificate into the local trusted peer database. Accordingly, next time the peers need to authenticate, the software will automatically authenticate them because each peer has a trusted copy of the other's certificate.

In one embodiment, it will be recognized that once a peer has been authenticated, a user may use that peer's signature to authenticate other peers implicitly. A user may decide to trust an authenticated peer signature to vouch for the identity of other peers. If they do, the peer is identified as someone whom the user trusts to vouch for the other user's identities and the peer's certificate is added to the set of certificates in the peer authenticator database. The certificate may be used for limited authentication chaining, which will be explained in greater detail below. A peer whose certificate is in the database is a trusted authenticator.

Explicit authentication can also be considered original authentication. When a peer is explicitly authenticated, additional authentication information is attached to that peer's certificate in the trusted database. The additional information includes the confidence level of that original authentication and the type of authentication (i.e., explicit).

Figure 5:
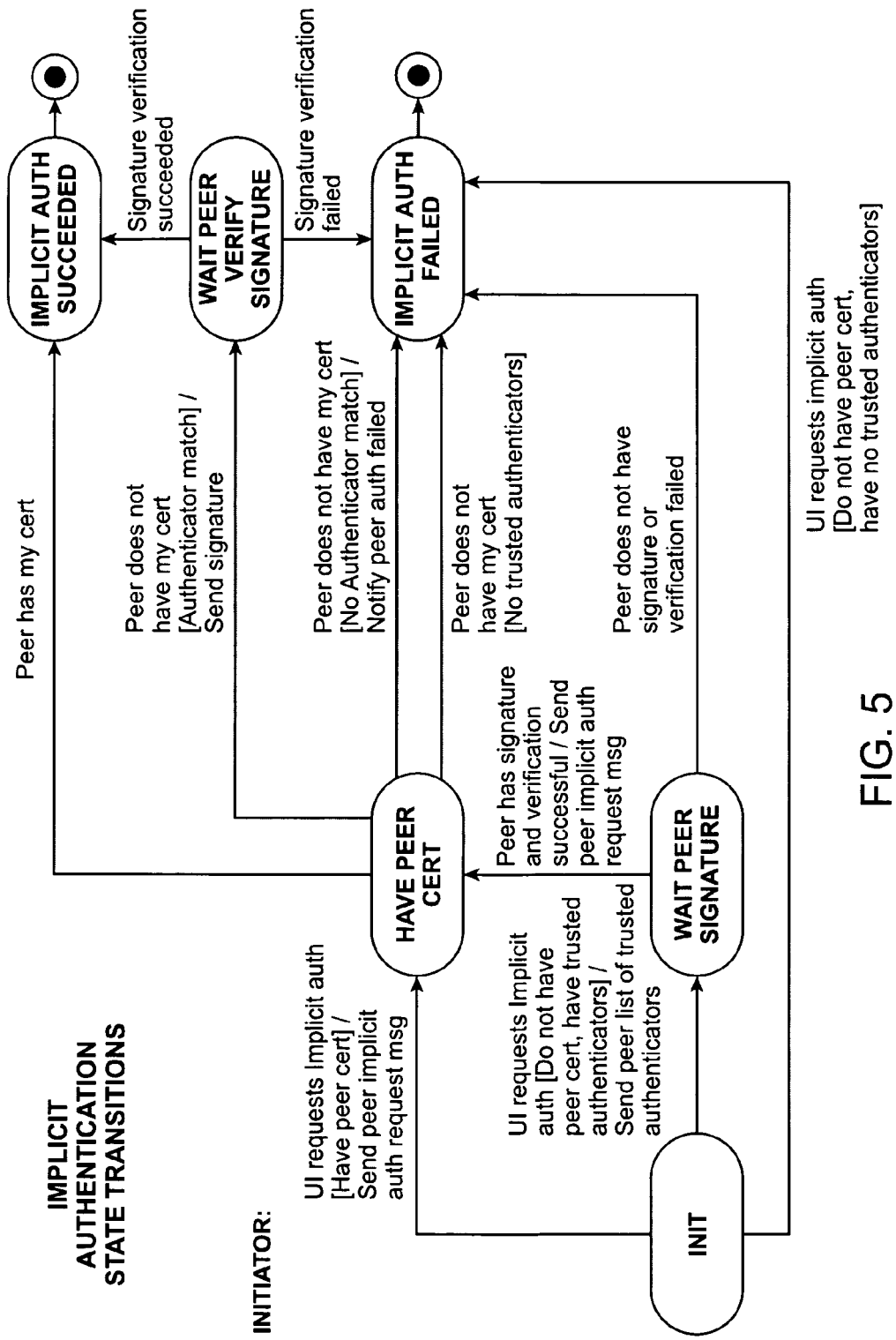
FIG. 5 is a diagram that illustrates implicit authentication of one embodiment of the present invention.
Figure 5:
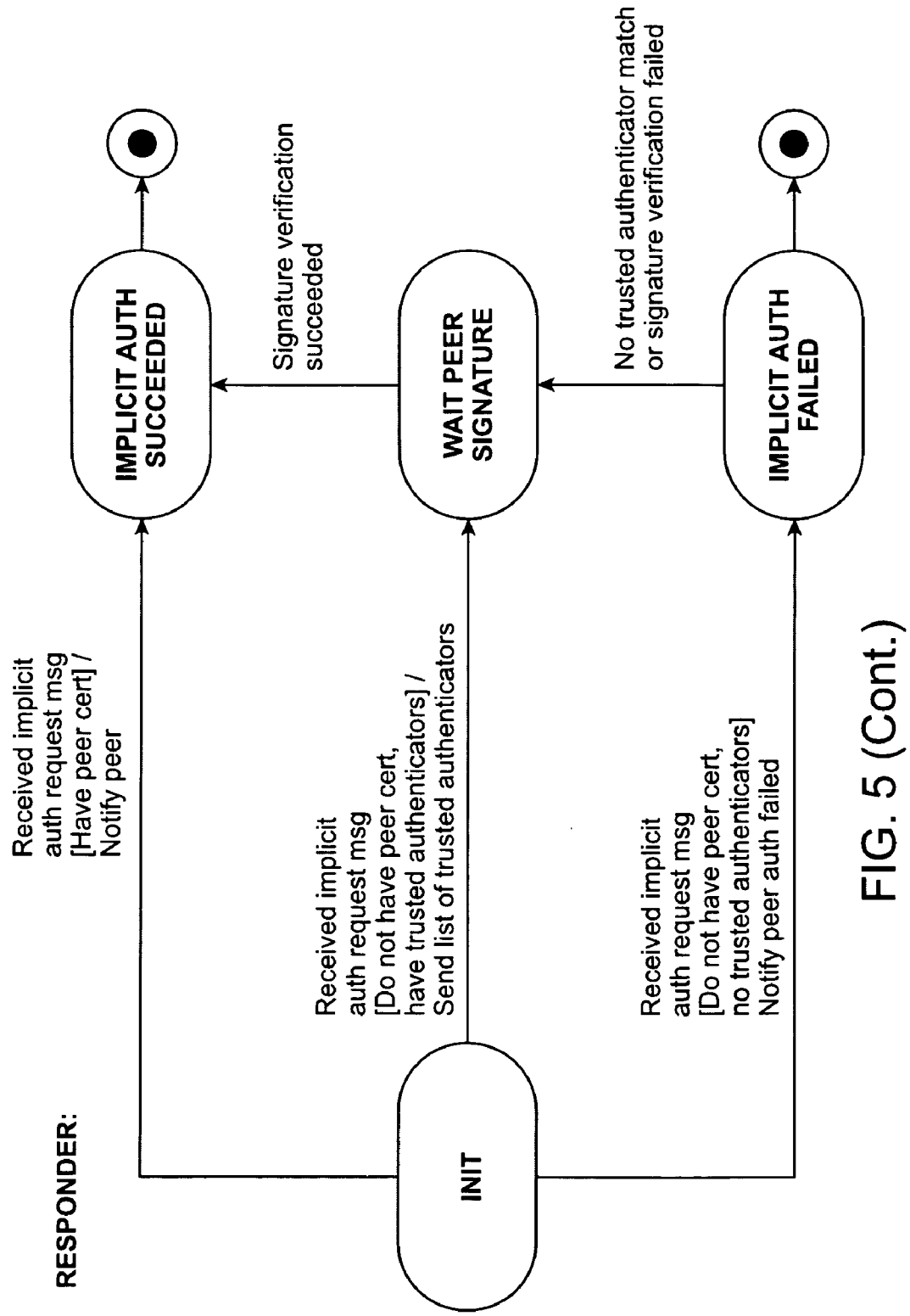

Referring to FIG. 5, implicit authentication can occur when the user does not have a copy of a peer's certificate in its trusted database, but a trusted peer authenticator in the local peer authenticator database has signed the peer's certificate. The user knows he can trust the peer's identity, because the peer's certificate has been signed by one of the authenticators whom the user trusts to vouch for other peer's identities. As previously mentioned, this is called authentication chaining, and the peer authenticator whose signature was used for authentication chaining to occur is called the signatory. If each side is able to implicitly authenticate the other, then collaboration can occur immediately without the manual explicit authentication step. Each side also signs the other's certificate at this point, to enable further authentication chaining. The information about the confidence level of the original authentication (by the trusted authenticator) is attached to the peer's certificate, as is an indicator that the authentication for this user was implicit.

In one example of implicit authentication, each side first checks if it already has a copy of the other peer's certificate. If peer A does not have a copy of B's certificate, it sends B a list of its trusted authenticators. B will check if it has a signature corresponding to one of those trusted authenticators. If yes, it sends this signature across. A first compares all fields of the signature certificate and the in-band certificate except the issuer name and the signature. Assuming there is a match, A then uses the public key in its copy of the trusted authenticator's (TA's) certificate to verify the signature on the signature certificate. If this verification is successful, A imports the in-band certificate in to his trusted database. His side of the implicit authentication is complete.

In this example, the two instances also exchange certificates for implicitly authenticated peers for storage in the trusted peer database, so that in future, authentication will be automatic, even if the certificate of the signatory who allowed authentication chaining to occur has been removed (e.g. the signatory asked everyone to delete her certificate because she suspected her private key had been compromised). Note that the signing indicates successful identification, but does not necessarily mean that they will trust each other's authentications. The signing after implicit authentication does mean that if there is another peer that trusts the user's authentications, he or she will trust both those that the user has authenticated with implicit authentication as well as those the user has authenticated with explicitly. In implicit authentication, the user is not given the option to identify the peer as a trusted implicit authenticator.

Implicit authentication can be implemented according to user or application level authentication requirements. For example, the user may not be completely comfortable with the way in which the original authenticator verified the peer's identity, especially in the case where the signatory may in fact have himself implicitly authenticated the peer in question. Because the information about the authentication (the authentication level, or confidence level, of the original explicit authentication, and the method) is available as part of that peer's credentials, the user (or application) can decide whether to continue with the implicit authentication or whether to authenticate the peer explicitly, or discontinue future communications.

The additional information about authentication method and confidence is especially important in the case of remote collaboration, where peers are not able to see and to verify each other's identities locally.

In one example, implicit and explicit authentication have the same effect inasmuch that in both cases the certificates are exchanged, lodged in the trusted database, and mutually signed. It is the invocation and process that is implicit, not certificate possession. So if A trusts B to authenticate, when A connects with C whose certificate has already been authenticated by B (and A can see this by inspecting C's signatures) then A can implicitly authenticate C.

In all cases, A has copies of certificates for every peer whom he has authenticated (whether implicitly or explicitly) in his local trusted peer database (e.g. the trusted peer database would contain certificates for A, B and C while the peer authenticator database contains only B's signature).

In the present invention, the decision to trust another peer's authentications can only be made immediately after an explicit authentication with that peer. At that point, the peer's certificate is designated as a trusted authenticator (TA) certificate and stored in a special location. Implicit authentication simply involves B trying to determine if A's certificate has been signed by one of B's TA's, and vice versa.

In an implicit authentication triggered through a chat, each side can use any of their TA's to authenticate the other such that there is no requirement that the TA used be in the chat or even online. When implicit authentication succeeds, each side imports the other's certificate, so that the TA certificates used will not be required for future authentications.

In one example, authentication information related to a certificate is additionally stored. A list of certificate signatures on a certificate separate from the certificate itself can be maintained. In one example, the system stores the following information for a trusted certificate:

Explicit Authenticator Name: The name of the peer whoexplicitly authenticated the owner of the certificate. If the local user were authenticating with a CA it would be the name of the CA.

Authentication Level (Confidence Level): The authentication level assigned by the explicit authenticator according to the authentication method used.

Authentication method: The method that the local user used to authenticate the peer (i.e., either Implicit or Explicit).

Furthermore, the system may also maintain the following information regarding each certificate signature:

Subject Name: Name of the certificate owner.

Name of Signer: Name of the peer who signed the certificate.

Signer's Authentication Method: Did the signer perform an explicit or implicit authentication with the subject?

Explicit Authenticator Name: The name of the peer who originally performed an explicit authentication with the subject.

Authentication Level: Authentication level assigned by the original explicit authenticator.

This information may be modified by subsequent authentications.

The signer can combine these fields with the certificate prior to signing. Accordingly, in one example, the signature confirms the contents of the certificate, but also the value of the fields. Thus, the holder of a signature cannot assign a higher confidence level than was indicated by the signatory.

It will be recognized that the information stored with the certificate is related to the authentication level that the user has assigned to a given certificate. The information stored with the user's signatures is related to the confidence levels others have assigned to the user's certificate. Because the user should not be able to modify the confidence level that someone else has assigned to his certificate, the signature verifies the authentication information and confidence level, as well as the certificate itself.

As previously mentioned, a certificate authority (CA) may be used for authentication. Although the present invention is not dependent upon a CA, users can take advantage of such an authority when one is available. In the case where the CA is available, the CA is treated similarly to a trusted authenticator (TA). Accordingly, each user imports the CA's certificate as a TA, and each user gets their certificate signed by the CA. Thus the CA does not have to act as a certificate repository, but as another TA. Authentication with a CA is always explicit.

In authentication chaining, the security and verification of the trusted relationships extending along the chain are weakened. The degree of confidence that the user has in each authenticator along the chain may diminish as the web of trust extends indefinitely. Furthermore, there are additional problems related to the storage requirements of certificates to support levels of indirection. For example, to support more than 1 degree of indirection in authentication, each side would have to download the certificates of the peers trusted authenticators because those certificates are needed to verify the trusted authenticators signatures on other peers' certificates. For small portable computing devices, this would be infeasible.

Figure 6:
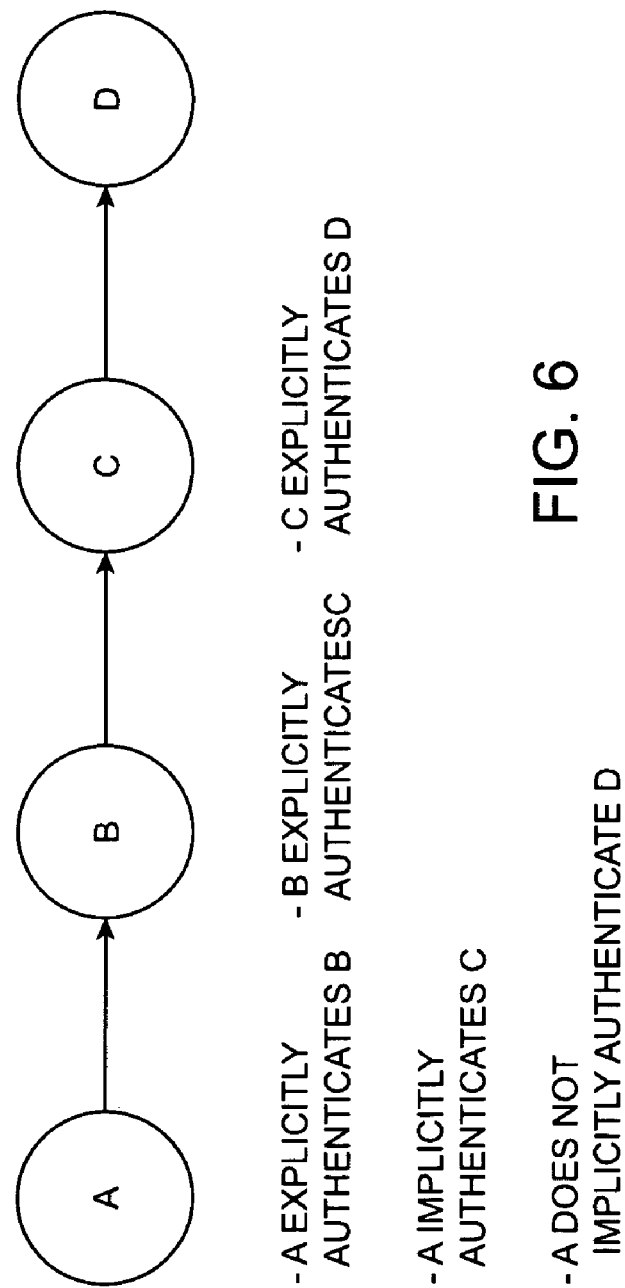
FIG. 6 is a diagram that illustrates an embodiment that limits implicit authentication.

In one embodiment, the extent of the trusted relationship is limited to one indirect link. Referring to FIG. 6, A can authenticate C because both have been authenticated by B who is the trusted authenticator. However, in the situation where there is more than one level of indirection, this trusted relationship is not extended. For example, consider the situation in FIG. 6 where:

A and B are authenticated

A trusts B as an authenticator

C and D are authenticated

D trusts C as an authenticator

C and B are authenticated

B and C trust each other as authenticators

When A sees C, A will be able to implicitly authenticate C, as B has signed C's certificate and A trusts B. However, A will not be able to implicitly authenticate D because A has not identified C as a trusted authenticator, nor has yet authenticated C, and because A cannot follow a trust link from B to C to accept C's authentication. However, once A has authenticated C, he can inspect the information about D, and decide whether to implicitly or explicitly authenticate D.

However, the situation can arise that implicit authentications propagate. For example, where A trusts B as a trusted authenticator and B trusts C as a TA. C has implicitly authenticated D, so B can implicitly authenticate D. Then A could indeed implicitly authenticate A, as D has B's signature and A trusts D.

In one embodiment, A can only implicitly authenticate C when C has previously been authenticated by one of A's trusted authenticators (such as B).

Determining how the system handles issues of chaining authentication is a design consideration such that authentication requirements could vary according to activity. The system designer, system administrator, or user can restrict or open access to certain types of collaborative activities depending on the confidence level information. For example, such services as data synchronization might be deemed to require higher confidence levels and no implicit authentication chaining, while chat sessions are much less constrained. In one example, the user can choose to work at a lower level of confidence, explicitly authenticate the other peer, or reject certain activities.

In one embodiment, implicit authentication can be triggered when the user tries to initiate an activity with an unauthenticated peer (file transfer, instant message (IM), chat). The software of the present invention will try to implicitly authenticate the user with the peer—if it fails, it will notify the user that she must explicitly authenticate with the peer before she can do anything further. Implicit authentication can also be triggered when the user joins a chat that contains peers that are not authenticated. Again, the software will attempt to implicitly authenticate the user with those peers. However, in this case, if implicitly authentication fails, the user is not prompted, and he can proceed to chat with the unauthenticated peers. Peers in a chat who are unauthenticated with the user are represented accordingly. At any time the user can initiate an authentication request with any of those peers.

A user may wish to re-authenticate a peer if he or she wishes to increase the level of confidence in the peer's identity. This occurs in the case of a CA where the user has the opportunity to update the peer's certificate. The user can re-authenticate and update information about the certificates in its trusted database at any time that a better authentication method (i.e., higher confidence level) is available. For example, a certificate with a lower authentication level can be later verified with a certificate authority and correspondingly reconfigured in the database with the highest confidence level.

In the case where the user connects with a CA at a different time than when the peer interactions occurred, the user can trigger an authentication update for any or all certificates in his or her database. This allows a user to have a previous authentication in his or her trusted database that has a lower confidence level than provided by a CA. The user can then update the authentication to a higher level in order to exchange information with more trusted peers at a later time.

The validity of a certificate may be limited to some period of time after which the peer must be re-authenticated. This type of validity interval can be tailored using the confidences and method information of the certificates described for the present invention. For example, authentications with the lowest authentication level might only persist for the time of the collaboration, where authentications with higher confidence levels might endure for weeks or months.

Often times it is advantageous to authenticate only those peers who wish to exchange information in a certain activity as needed. The establishment of secure, encrypted connections independent of authenticated identities at each end of those connections protects the network from basic security violations such as "sniffing", where unauthorized users intercept and read the exchanged information on the wire. This allows the collaborative system architect to designate different authentication requirements for different types of activity.

In one example, chat is considered an activity or application in which all users may not need to be authenticated with all other users in the chat group, whereas file sharing, database synchronization and file transfer are considered to require a higher assurance of security and thus require complete authentication.

When user A wants to view another peer B's shared files, transfer a file to B, or invite B to a chat, A must authenticate B (and vice versa). As described above, this authentication can take place explicitly or implicitly.

However, in a chat, the situation can arise where not all peers are authenticated with all other peers. For example, in a chat with A, B, and C, A and C may have authenticated each other, and B and C may as well have authenticated each other, but A and B are not directly authenticated. Thus a user can participate in a chat even if he is not authenticated (explicitly or implicitly) with all members of the chat. The user gets a clear visual indication for those members of the chat with whom he or she is not authenticated. The connection established by the present invention to an unauthenticated user is already encrypted, thus protected from packet sniffers. This reduces the risk to that of a "man in the middle" attack or impersonators, requiring only authentication.

The current embodiment leaves it up to the user to decide if this is a real risk in a given scenario. If it is, they can either exit the chat, watch what they say, or attempt to authenticate with the unauthenticated users. Note that this chat application design is not mandated by this authentication approach. Other implementations might require authentication for all activities, or only when directly demanded by a particular user. For example, one could also start a chat, specifying the minimum type of authentication required (only explicit level, high, or any type (low, implicit OK)) which could force only peers mutually authenticated in this way to participate.

This approach has several advantages. It minimizes the load of authentication processing and storage to encompass only those other peers with whom the user is directly interacting. It also simplifies the process of authenticating with other users by relying on an extension of trust embodied in other peers whom the user trusts to authenticate previously unknown peers. Implicit authentication automatically ensures an authenticated collaborator without interrupting the higher-level flow of the collaboration. However, because the information about how those trusted authenticators executed those authentications is available, the user or the system designer can stipulate at which point their confidence in the authentication is not sufficient and force an explicit authentication. This provides flexibility without compromising the more stringent authentication requirements that may arise in various application or group contexts. This relates to another benefit of the method: namely, that authentication decisions can be made at a fine control resolution. Rather than imposing the same requirements across the entire system, the application designer can tailor them to a particular activity or tool. For example, as described, the current embodiment considers chat inherently more "open" than database synchronization. Moreover, the user can see and determine authentication requirements according to how he or she may be using a particular application. Again, using the example of a chat, the user may be simultaneously engaged in both a casual chat where not all peers are completely authenticated with each other, and a confidential chat in which all peers have been carefully authenticated. Finally, the separation of secure, encrypted connections from identity management and authentication allows users to flexibly control how secure certain collaborations need to be and enables the system designer to impose authentication requirements at the level of activity type in the system, rather that across the board.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A device connectable to a peer-to-peer network, the device comprising:
a memory; and
a processor configured to:
allow collaboration between units on the peer-to-peer network; and
produce an authentication level indication concerning the identity of another unit in the peer-to-peer network, the authentication level indication relating to the security of the process used to perform the authentication, wherein the possible authentication levels include a high authentication level and a low authentication level, the low authentication level being some evidence of unit authentication, wherein the processor is configured to use the authentication level indication to decide whether to allow a collaboration with another unit, wherein at least one collaborative application allows a collaboration with another unit when the authentication level indication is high but does not allow a collaboration with another unit when the authentication level indication is low.

2. The device of claim 1 wherein the processor is further configured to execute a chat application.

3. The device of claim 1 wherein the processor is further configured to perform file sharing.

4. The device of claim 1 wherein the processor is further configured to perform resource sharing.

5. The device of claim 1 wherein the processor is further configured to execute a database synchronization application.

6. The device of claim 1 wherein the processor is further configured to allow collaboration when the authentication level indication is low.

7. The device of claim 1 wherein the processor is further configured to receive from the user an indication of authentication levels required of other peers.

8. The device of claim 1 wherein there are more than two authentication levels.

9. The device of claim 8 wherein the authentication levels correspond to simple acceptance, digital certificate fingerprint comparison, out-of-band certificate comparison, and certificate authority confirmation.

10. The device of claim 1 wherein the authentication level indication is stored along with an identifier for another unit.

11. The device of claim 1 wherein the authentication level indication can be subsequently upgraded by re-authentication of the peer using a more secure authentication approach.

12. The device of claim 1 wherein implicit authentication is allowed.

13. A method comprising:
producing an authentication level indication concerning the identity of another unit in a peer-to-peer network, wherein the possible authentication levels include a high authentication level and a low authentication level, the authentication level indication relating to the security of the process used to perform the authentication, the low authentication level being some evidence of unit authentication; and
using the authentication level indication to decide whether to allow a collaboration with another unit, wherein at least one collaborative application allows a collaboration when the authentication level indication is high but does not allow a collaboration when the authentication level indication is low.

14. The method of claim 13 wherein when the authentication level indication is low there is a collaborative application that allows for collaboration.

15. The method of claim 13 wherein there are more than two authentication levels.

16. The method of claim 13 wherein the authentication levels correspond to simple acceptance, digital certificate fingerprint comparison, out-of-band certificate comparison, and certificate authentication confirmation.

17. The method of claim 13 wherein the authentication level indication is stored along with an identifier for the other unit.

18. The method of claim 13 wherein the method allows for implicit authorization.

19. The method of claim 13 wherein the collaboration application includes file sharing.

20. The method of claim 13 wherein the collaboration application includes resource sharing.

21. The method of claim 13 wherein the user can specify authentication levels required of other peers.

22. The method of claim 13 wherein the authentication level indication can be subsequently upgraded by re-authentication of the peer using a more secure authentication approach.

23. A computer-readable medium containing a program that executes the following procedure:
producing an authentication level indication concerning the identity of another unit in a peer-to-peer network, wherein the possible authentication levels include a high authentication level and a low authentication level, the authentication level indication relating to the security of the process used to perform the authentication, the low authentication level being some evidence of unit authentication; and
using the authentication level indication to decide whether to allow a collaboration with another unit, wherein at least one collaborative application allows a collaboration when the authentication level indication is high but does not allow a collaboration when the authentication level indication is low.

24. The computer readable medium containing a program of claim 23 wherein when the authentication level indication is low there is a collaborative application that allows for collaboration.

25. The computer readable medium containing a program that executes a procedure of claim 23 wherein the procedure is such that there are more than two authentication levels.

26. The computer readable medium containing a program that executes a procedure of claim 23 wherein the authentication level indication is stored along with an identifier for the other unit.

27. The computer readable medium containing a program that executes a procedure of claim 23 wherein the authentication levels correspond to simple acceptance, digital certificate fingerprint comparison, out-of-band certificate comparison, and certificate authority confirmation.

28. The computer readable medium containing a program that executes a procedure of claim 23 wherein the procedure allows for implicit authorization of units.

29. The computer readable medium containing a program of claim 23 wherein the collaboration application includes file sharing.

30. The computer readable medium containing a program of claim 23 wherein the collaboration application includes resource sharing.

31. The computer readable medium containing a program of claim 23 wherein the user can specify authentication levels required of other peers.

32. The computer readable medium containing a program of claim 23 wherein the authentication level indication can be subsequently upgraded by re-authentication of the peer using a more secure authentication approach.

33. A device comprising:
means for producing an authentication level indication concerning the identity of another unit in a peer-to-peer network, wherein the possible authentication levels include a high authentication level and a low authentication level, the authentication level indication relating to the security of the process used to perform the authentication, the low authentication level being some evidence of unit authentication; and
means for using the authentication level indication to decide whether to allow a collaboration with another unit, wherein at least one collaborative application allows a collaboration when the authentication level indication is high but does not allow a collaboration when the authentication level indication is low.

34. The device of claim 33 wherein when the authentication level indication is low there is a collaborative application that allows for collaboration.

35. The device of claim 33 wherein there are more than two authentication levels.

36. The device of claim 33 wherein the authentication levels correspond to simple acceptance, digital certificate fingerprint comparison, out-of-band certificate comparison, and certificate authentication confirmation.

37. The device of claim 33 wherein the authentication level indication is stored along with an identifier for the other unit.

38. The device of claim 33 wherein the device is further configured to allow for implicit authorization.

39. The device of claim 33 wherein the collaboration application includes file sharing.

40. The device of claim 33 wherein the collaboration application includes resource sharing.

41. The device of claim 33 wherein the device is further configured to accept a specification of authentication levels required of other peers.

42. The method of claim 33 wherein the authentication level indication can be subsequently upgraded by re-authentication of the peer using a more secure authentication approach.

* * * * *